(12) United States Patent
Koo et al.

(10) Patent No.: US 11,476,550 B2
(45) Date of Patent: Oct. 18, 2022

(54) SECONDARY BATTERY CAPABLE OF EQUALIZING INTERNAL/EXTERNAL PRESSURE

(71) Applicant: Samsung SDI Co., Ltd., Yongin-si (KR)

(72) Inventors: Min Seok Koo, Yongin-si (KR); Sang Won Byun, Yongin-si (KR); Hyun Soo Lee, Yongin-si (KR); Hyun Young Lim, Yongin-si (KR); Jun Min Choi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 25 days.

(21) Appl. No.: 16/627,194

(22) PCT Filed: Apr. 18, 2018

(86) PCT No.: PCT/KR2018/004507
§ 371 (c)(1),
(2) Date: Dec. 27, 2019

(87) PCT Pub. No.: WO2019/013433
PCT Pub. Date: Jan. 17, 2019

(65) Prior Publication Data
US 2020/0227715 A1    Jul. 16, 2020

(30) Foreign Application Priority Data

Jul. 10, 2017 (KR) .......................... 10-2017-0087227

(51) Int. Cl.
*H01M 50/543* (2021.01)
*H01M 50/169* (2021.01)
(Continued)

(52) U.S. Cl.
CPC ....... *H01M 50/543* (2021.01); *H01M 50/169* (2021.01); *H01M 50/172* (2021.01); *H01M 50/3425* (2021.01); *H01M 50/578* (2021.01)

(58) Field of Classification Search
CPC . H01M 50/578; H01M 50/367; H01M 50/375
See application file for complete search history.

(56) References Cited

U.S. PATENT DOCUMENTS

| 5,538,807 A | 7/1996 | Hagiuda |
| 8,435,659 B2 | 5/2013 | Byun et al. |

(Continued)

FOREIGN PATENT DOCUMENTS

| JP | 2004-281061 A | 10/2004 |
| KR | 10-2011-0005197 A | 1/2011 |

(Continued)

OTHER PUBLICATIONS

International Search Report for corresponding International Application No. PCT/KR2018/004507, dated Nov. 14, 2018, 5pp.

(Continued)

*Primary Examiner* — Brian R Ohara
*Assistant Examiner* — Patrick Marshall Greene
(74) *Attorney, Agent, or Firm* — Lewis Roca Rothgerber Christie LLP

(57) ABSTRACT

Various embodiments of the present invention pertain to a secondary battery, and a technical problem thereof to be solved is providing a secondary battery that is capable of equalizing internal/external pressure. To this end, disclosed in the present invention is a secondary battery comprising: an electrode assembly; a case that accommodates the electrode assembly; a cap plate that seals the case, and that has a safety vent that is ruptured when internal pressure of the case rises; a terminal portion that is electrically connected to the electrode assembly, and that extends outwardly from the (Continued)

cap plate; and a pressure equalization structure that is formed on the cap plate so as to equalize the internal pressure and external pressure of the case.

10 Claims, 8 Drawing Sheets

(51) Int. Cl.
*H01M 50/172* (2021.01)
*H01M 50/578* (2021.01)
*H01M 50/342* (2021.01)

(56) References Cited

U.S. PATENT DOCUMENTS

| | | |
|---|---|---|
| 8,647,759 B2 | 2/2014 | Han et al. |
| 8,802,254 B2 | 8/2014 | Lee |
| 8,999,539 B2 | 4/2015 | Kim |
| 9,012,050 B2 | 4/2015 | Byun et al. |
| 9,246,140 B2 | 1/2016 | Kim et al. |
| 2010/0167107 A1* | 7/2010 | Byun ............... H01M 50/572 429/56 |
| 2010/0279156 A1 | 11/2010 | Kim et al. |
| 2012/0015218 A1 | 1/2012 | Lee |
| 2013/0029191 A1 | 1/2013 | Byun et al. |
| 2013/0115511 A1 | 5/2013 | Han et al. |
| 2014/0193675 A1 | 7/2014 | Kim |

FOREIGN PATENT DOCUMENTS

| | | |
|---|---|---|
| KR | 10-1023104 | 3/2011 |
| KR | 10-2012-0009592 A | 2/2012 |
| KR | 10-1191657 B1 | 10/2012 |
| KR | 10-2013-0012627 A | 2/2013 |
| KR | 10-2013-0050070 A | 5/2013 |
| KR | 10-2014-0090514 A | 7/2014 |

OTHER PUBLICATIONS

Korean Office action issued in corresponding application No. KR 10-2017-0087227, dated Mar. 14, 2022, 7 pages.

* cited by examiner

SECONDARY BATTERY CAPABLE OF EQUALIZING INTERNAL/EXTERNAL PRESSURE

CROSS-REFERENCE TO RELATED APPLICATION(S)

This application is a National Phase Patent Application of International Patent Application Number PCT/KR2018/004507, filed on Apr. 18, 2018, which claims priority of Korean Patent Application No. 10-2017-0087227, filed Jul. 10, 2017. The entire contents of both of which are incorporated herein by reference.

TECHNICAL FIELD

Various embodiments of the present invention pertain to a secondary battery capable of equalizing internal/external pressure.

BACKGROUND ART

Unlike primary batteries which are not rechargeable, secondary, rechargeable batteries can be charged and discharged. Low-capacity secondary batteries packaged in form of a pack including a single battery cell are widely employed in portable small-sized electronic devices, such as cellular phones or camcorders, while large-capacity secondary batteries packaged in forms of battery packs including tens of battery cells connected to one another are widely used for driving motors of hybrid automobiles or electric automobiles.

Meanwhile, since internal gases are generated from a secondary battery as the secondary battery is used for an extended period of time, the internal pressure of the secondary battery gradually rises. Accordingly, safety-related components of the secondary battery, such as an overcharge preventing element and/or a safety vent, may not be properly operated.

The above information disclosed in this Background section is only for enhancement of understanding of the background of the described technology and therefore it may contain information that does not form the prior art that is already known in this country to a person of ordinary skill in the art.

Technical Problems to be Solved

Various embodiments of the present invention provide a secondary battery capable of equalizing internal/external pressure. In addition, various embodiments of the present invention provide a secondary battery enabling safety-related components to normally operate while being capable of equalizing internal/external pressure. In addition, various embodiments of the present invention provide a secondary battery capable of preventing external foreign matter from penetrating into the battery and preventing an electrolyte accommodated within the battery from leaking out while being capable of equalizing internal/external pressure. In addition, various embodiments of the present invention provide a secondary battery capable of maintaining am internal vacuum during a battery assembling process.

Technical Solutions

The secondary battery according to various embodiments of the present invention includes an electrode assembly, a case that accommodates the electrode assembly, a cap plate that seals the case, and that has a safety vent that is ruptured when internal pressure of the case rises, a terminal portion that is electrically connected to the electrode assembly, and that extends outwardly from the cap plate, and a pressure equalization structure that is formed on the cap plate so as to equalize the internal pressure and external pressure of the case.

The pressure equalization structure may include a throughhole located in the cap plate, and a breathable film bonded to the throughhole. The secondary battery may further include a bonding layer positioned between the bottom periphery of the breathable film and the cap plate. The secondary battery may further include a ring member positioned on the top periphery of the breathable film to be welded to the cap plate. The secondary battery may further include an injection molding located at the periphery of the breathable film. Here, the injection molding may be fitted into the throughhole in an interferential fit manner.

The terminal portion may include a terminal pillar connected to the electrode assembly and passing through the cap plate, and a connection plate coupled to the terminal pillar and located on the cap plate in an insulated state, and the cap plate may further include an inversion plate located to correspond to the connection plate.

The pressure equalization structure may be located at the cap plate overlapping with the connection plate. In addition, the pressure equalization structure may include a throughhole located in the cap plate, and a breathable film bonded to the throughhole. In addition, the pressure equalization structure may be located in the inversion plate. In addition, the pressure equalization structure may include a throughhole located in the cap plate, and a breathable film closing the throughhole. The connection plate may further include a throughhole.

Advantageous Effects

As described above, various embodiments of the present invention provide a secondary battery capable of equalizing internal/external pressure. That is to say, according to various embodiments of the present invention, when an internal pressure of the battery exceeds a reference pressure, a pressure equalization structure for discharging the internal air or gas is provided in a cap plate, thereby equalizing the internal pressure with the external pressure.

In addition, various embodiments of the present invention provide a secondary battery enabling safety-related components to normally operate while being capable of equalizing internal/external pressure. That is to say, according to various embodiments of the present invention, a pressure equalization structure operates at a first reference pressure, an inversion plate is inverted at a second reference pressure to operate a fuse, a safety vent is ruptured at a third reference pressure greater than the second reference pressure to rapidly discharge internal gases, thereby improving safety/reliability of battery.

In addition, various embodiments of the present invention provide a secondary battery capable of preventing external foreign matter from penetrating into the battery and preventing an electrolyte accommodated within the battery from leaking out while being capable of equalizing internal/external pressure. That is to say, according to various embodiments of the present invention, since the pressure equalization structure includes a breathable film, such as a Gore-Tex laminate, a PTFE film, a porous film, or a fine hole structure, the breathable film allows the internal air or gas of the battery to be exhausted without releasing an electrolyte accommodated in the battery or prevents external foreign matter from being penetrated into the battery.

In addition, various embodiments of the present invention provide a secondary battery capable of maintaining an internal vacuum during a battery assembling process. That is to say, according to various embodiments of the present invention, a throughhole having a diameter in the range from about 0.01 mm to about 0.1 mm is located in the pressure equalization structure, or a seal ball is temporarily coupled to the throughhole during an electrolyte injection process (the seal ball to be removed after the electrolyte injection process) to maintain the internal space of battery at a vacuum, thereby facilitating the electrolyte injection process.

BEST MODE FOR CARRYING OUT THE INVENTION

Figure 1:
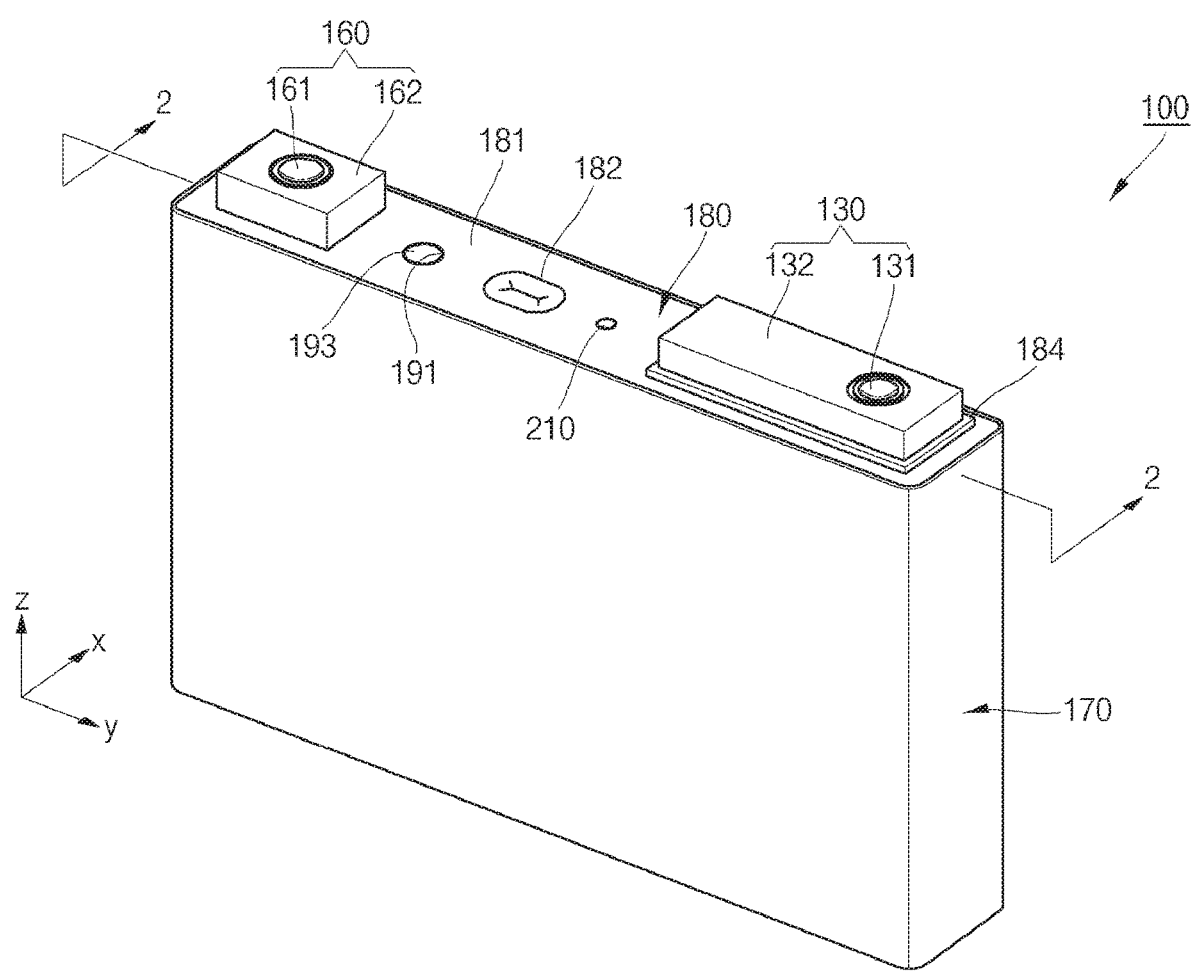
FIG. 1 is a perspective view of a secondary battery capable of equalizing internal/external pressure according various embodiments of the present invention.

Hereinafter, example embodiments of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

In addition, the term "breathable film" used herein means a film which is capable of "inhaling and breathing" to be permeable to gases/vapors and impermeable to liquids. The breathable film is configured to have continuous pores uniformly distributed therein and having a pore size of less than or equal to several micrometers ($\mu$m). That is to say, the breathable film is a representative functional film having permeability and waterproofness to allow gases/vapors to be permeable and liquids to be impermeable. The breathable film has a substantially similar external shape to a wrapping fabric and is made of a functional material having both a fabric-like property for air permeability and a vinyl-like property for liquid impermeability. The breathable film may include, for example, but not limited to, a Gore-Tex laminate, a polytetrafluoroethylene (PTFE) film, a porous film, a fine-hole structure, or the like.

Figure 2:
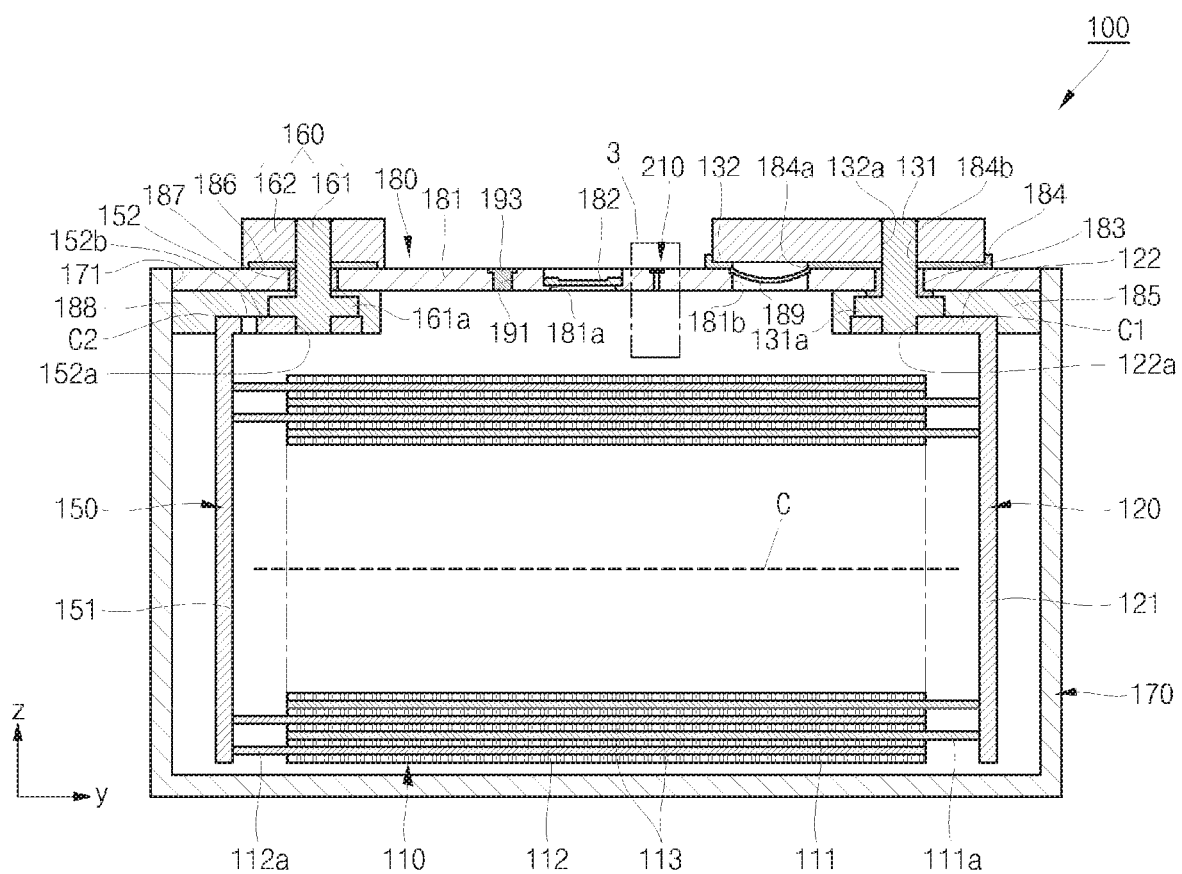
FIG. 2 is a cross-sectional view of the secondary battery, taken along the line 2-2 shown in FIG. 1.
Figure 3:
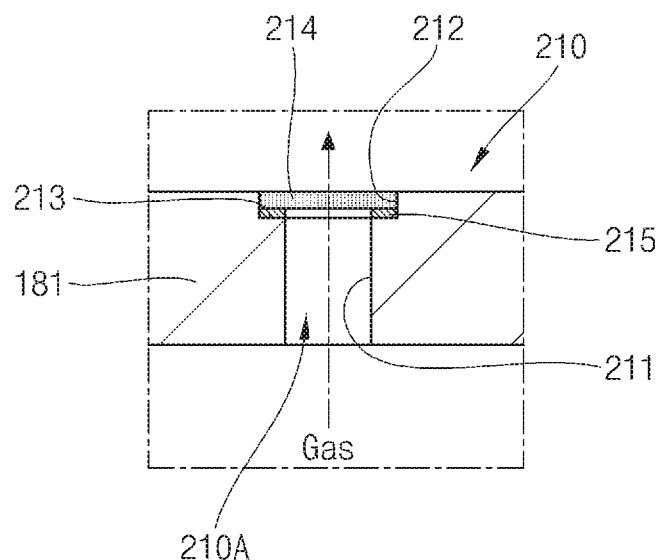
FIG. 3 is an enlarged cross-sectional view of a pressure equalization structure in a region 3 shown in FIG. 2.

FIG. 1 is a perspective view of a secondary battery capable of equalizing internal/external pressure according various embodiments of the present invention, FIG. 2 is a cross-sectional view of the secondary battery, taken along the line 2-2 shown in FIG. 1, and FIG. 3 is an enlarged cross-sectional view of a pressure equalization structure in a region 3 shown in FIG. 2.

First, referring to FIGS. 1 and 2, the secondary battery 100 according various embodiments of the present invention includes an electrode assembly 110, a first current collector plate 120, a first terminal portion 130, a second current collector plate 150, a second terminal portion 160, a case 170, a cap assembly 180 and a pressure equalization structure 210. The secondary battery 100 may include a plurality of secondary batteries connected to one another in series and in parallel to constitute a large-capacity battery pack for outputting high voltage power.

The electrode assembly 110 is formed by winding a stack of a first electrode plate 111, a separator 113, and a second electrode plate 112, which are thin plates or layers. The first electrode plate 111 may operate as a negative electrode and the second electrode plate 112 may be a positive electrode.

The first electrode plate 111 includes a negative electrode active material layer coated on both surfaces of a negative electrode current collector made of a conductive metal plate, such as a copper (Cu) or nickel (Ni) foil, for example. A carbon (C) based material, Si, Sn, tin oxide, composite tin alloy, transition metal oxide, lithium metal nitride or lithium metal oxide, may be used as a negative electrode active material of the negative electrode active material layer, but embodiments of the present invention are not limited to the materials of the active material of the negative electrode active material layer disclosed herein. In addition, the first electrode plate 111 includes a first electrode uncoated portion 111a that is a portion of the first electrode plate 111 having no negative electrode active material layer coated thereon.

The first electrode uncoated portion 111a becomes a path for the flow of electric current between the first electrode plate 111 and the exterior of the first electrode plate 111. However, embodiments of the present invention are not limited to the materials of the first electrode plate 111 disclosed herein.

The second electrode plate 112 may include a positive electrode active material layer coated on both surfaces of a positive electrode current collector made of a highly conductive metal foil, such as an aluminum (Al) foil, for example. A chalcogenide compound may be used as a positive electrode active material of the positive electrode active material layer, and examples thereof may include composite metal oxides, such as $LiCoO_2$, $LiMn_2O_4$, $LiNiO_2$, $LiNi_{1-x}Co_xO_2$, (0<x<1), or $LiMnO_2$, but embodiments of the present invention are not limited to the materials of the active material of the positive electrode active material layer disclosed herein. In addition, the second electrode plate 112 includes a second electrode uncoated portion 112a that is a portion of the second electrode plate 112 having no positive electrode active material layer coated thereon.

The second electrode uncoated portion 112a becomes a path for the flow of electric current between the second electrode plate 112 and the exterior of the second electrode plate 112. However, embodiments of the present invention are not limited to the materials of the second electrode plate 112 disclosed herein.

In an embodiment, polarities of the first electrode plate 111 and the second electrode plate 112 may be reversed. That is to say, the first electrode plate 111 may operate as a positive electrode, and the second electrode plate 112 may operate as a negative electrode.

The separator 113 prevents the likelihood of an electric short circuit between the first electrode plate 111 and the second electrode plate 112 and allows charges of the secondary battery 100, e.g., lithium ions, to move therebetween. The separator 113 may be made of a material selected from the group consisting of polyethylene, polypropylene, and a copolymer of polyethylene and polypropylene. However, embodiments of the present invention are not limited to the materials of the separator 113 disclosed herein. In one embodiment, the separator 113 preferably has a width larger than that of at least one of the first electrode plate 111 or the second electrode plate 112, which is advantageous in preventing or substantially preventing an electric short circuit from occurring between the first electrode plate 111 and the second electrode plate 112.

The first current collector plate 120 and the second current collector plate 150 to be electrically coupled to the first electrode plate 111 and the second electrode plate 112, respectively, are coupled to opposite ends of the electrode assembly 110. In an example embodiment, the first current collector plate 120 and the second current collector plate 150 are coupled to the opposite ends of the electrode assembly 110 at the first electrode uncoated portion 111a and the second electrode uncoated portion 112a, respectively.

Although the first electrode uncoated portion 111a and the second electrode uncoated portion 112a extending in a horizontal direction within the case 170 are shown, the first electrode uncoated portion 111a and the second electrode uncoated portion 112a may extend in a vertical direction within the case 170. That is to say, the first electrode uncoated portion 111a and the second electrode uncoated portion 112a may upwardly extend a predetermined length from a top end of the electrode assembly 110. In other words, although a winding axis C of the electrode assembly 110 parallel to a cap plate length direction is shown, the winding axis C of the electrode assembly 110 may be substantially perpendicular to cap plate length direction.

The electrode assembly 110 is accommodated in the case 170 together with an electrolyte. The electrolyte may include lithium salt, such as $LiPF_6$ or $LiBF_4$, dissolved in an organic solvent, such as ethylene carbonate (EC), propylene carbonate (PC), diethyl carbonate (DEC), ethyl methyl carbonate (EMC), or dimethyl carbonate (DMC). The electrolyte may exist in a liquid phase, a solid phase, or a gel phase.

The first current collector plate 120 may be made of a conductive material, such as a material selected from the group consisting of aluminum, copper, a copper alloy, and equivalents thereof.

The first current collector plate 120 makes contact with the first electrode uncoated portion 111a protruding to one end of the electrode assembly 110 to be electrically connected to the first electrode plate 111. The first current collector plate 120 includes a first electrode connecting portion 121 connected to the first electrode plate 111 and a first terminal connecting portion 122 connected to the first terminal portion 130. The first current collector plate 120 may be provided as a single body. The first current collector plate 120 may have a corner C1 that is a bent portion between the first electrode connecting portion 121 and the first terminal connecting portion 122. That is to say, the first current collector plate 120 may be substantially in an inverted "L" (⌐) shape.

The first electrode connecting portion 121 makes contact with the first electrode uncoated portion 111a protruding to one end of the electrode assembly 110 to be electrically connected to the first electrode plate 111.

The first electrode connecting portion 121 is welded to the first electrode uncoated portion 111a and is configured to stand in a vertical direction.

The first terminal connecting portion 122 is welded to the first terminal portion 130 and is shaped of a plate configured to lie in a substantially horizontal direction to be installed between a cap plate 181 of the cap assembly 180 and the electrode assembly 110. The first terminal connecting portion 122 is installed between a cap plate 181 of the cap assembly 180, which will later be described, and the electrode assembly 110. A first fastening hole 122a is located in the first terminal connecting portion 122 to pass through top and bottom surfaces of the first terminal connecting portion 122. A lower region of a first electrode terminal pillar 131 is fitted into and engaged with the first fastening hole 122a. The first fastening hole 122a may be sized to correspond to the lower region of the first electrode terminal pillar 131 so as to accommodate the lower region of the first electrode terminal pillar 131.

The first terminal portion 130 includes the first electrode terminal pillar 131 and a first connection plate 132.

The first electrode terminal pillar 131 passes through the cap plate 181, to be described further later, and upwardly extends and protrudes a predetermined length. In addition, the first electrode terminal pillar 131 is electrically connected to the first current collector plate 120 under the cap plate 181. While the first electrode terminal pillar 131 upwardly extends and protrudes a predetermined length from the cap plate 181, a laterally extending flange 131a may be located under the cap plate 181 to prevent the first electrode terminal pillar 131 from being dislodged from the cap plate 181. In an embodiment, a region of the first electrode terminal pillar 131 located below the flange 131a may be fitted into the first fastening hole 122a of the first current collector plate 120 to then be riveted or welded. In addition, a region of the first electrode terminal pillar 131 located above the flange 131a may pass through the cap plate 181 and upwardly extend and protrude a predetermined length. The first terminal plate 132 may be fixed to the extending and protruding region of the first electrode terminal pillar 131.

The first connection plate 132 is spaced apart from the cap plate 181 by an upper insulation member 184, to be described later, and may be positioned to be parallel with the cap plate 181.

The first connection plate 132 is generally made of a conductive metal or an equivalent thereof and is electrically connected to the first electrode terminal pillar 131.

A first terminal hole 132a is located in the first connection plate 132 to allow an upper region of the first electrode terminal pillar 131 to pass through the first terminal hole 132a. The upper region of the first electrode terminal pillar 131 of the first terminal portion 130 is fitted into and engaged with the first terminal hole 132a. That is to say, the first terminal hole 132a may be sized to correspond to the upper region of the first electrode terminal pillar 131 so as to accommodate the upper region of the first electrode terminal pillar 131.

The first terminal hole 132a has a larger size than the first electrode terminal pillar 131, and an extending portion 184b of the first upper insulation member 184, to be described later, is inserted into a portion between the first electrode terminal pillar 131 and the first terminal hole 132a.

The second current collector plate 150 includes a second electrode connecting portion 151 connected to the second electrode plate 112 and a second terminal connecting portion 152 connected to the second terminal portion 160. The second current collector plate 150 may be provided as a single body. The second current collector plate 150 may have a corner C2 that is a bent portion between the second electrode connecting portion 151 and the second terminal connecting portion 152. That is to say, the second current collector plate 150 be substantially in an inverted "L" (⌐) shape. The second current collector plate 150 may be made of a conductive material selected from the group consisting of aluminum, an aluminum alloy and an equivalent thereof.

The second electrode connecting portion 151 makes contact with the second electrode uncoated portion 112a protruding to one end of the electrode assembly 110 to be electrically connected to the second electrode plate 112. The second electrode connecting portion 151 is welded to the second electrode uncoated portion 112a and is configured to stand in a vertical direction.

The second terminal connecting portion 152 is welded to the second terminal portion 160 and is shaped of a plate configured to lie in a substantially horizontal direction to be installed between the cap plate 181 of the cap assembly 180, to be described later, and the electrode assembly 110.

A second fastening hole 152a and a fuse hole 152b are located in the second terminal connecting portion 152 to pass through top and bottom surfaces of the second terminal connecting portion 152. A second electrode terminal pillar 161 of the second terminal portion 160 is fitted into and engaged with the second terminal portion 160. That is to say, the second fastening hole 152a may be sized to correspond to the second electrode terminal pillar 161 so as to accommodate the second electrode terminal pillar 161.

The fuse hole 152b is located at a region of second terminal connecting portion 152, which is adjacent to the corner C2, so as not to overlap with the second fastening hole 152a coupled to the second electrode terminal pillar 161.

A region where the fuse hole 152b is located may have a smaller cross-sectional area than other regions of the second terminal connecting portion 152 by the presence of the fuse hole 152b.

Therefore, the region where the fuse hole 152b is located may be melted due to high-temperature heat generated when high current, e.g., 3,000 A or greater, instantaneously flows due to a high-current short circuit occurring to the secondary battery 100, thereby functioning as a fuse that cuts off the flow of current.

Here, the high-current short circuit may be induced when an inversion plate 189 of the cap assembly 180 makes contact with the first connection plate 132 in cases where heat is generated due to, for example, overcharge of the secondary battery 100, and the electrolyte is decomposed to make the internal pressure of the secondary battery 100 exceed a preset pressure. In addition, the high-current short circuit may also be induced when the second terminal portion 160 and the other side of the first connection plate 132 makes contact with each other by the secondary battery 100 being compressed in the Y-axis direction, or when the cap plate 181 and a bottom surface of the first connection plate 132 make direct contact with each other by the secondary battery 100 being compressed in the Z-axis direction. That is to say, since the region where the fuse hole 152b is located is melted due to the high-current short circuit to cut off the flow of current, the charging and discharging operations of the secondary battery 100 may be interrupted before a risk, such as a fire or explosion, The second terminal portion 160 is generally made of a metal or an equivalent thereof and is electrically connected to the second current collector plate 150. In addition, the second terminal portion 160 is electrically connected to the cap plate 181. The second terminal portion 160 includes the second electrode terminal pillar 161 accommodated in the second fastening hole 152a of the second current collector plate 150 and a second electrode connection plate 162 coupled to the second electrode terminal pillar 161.

The second electrode terminal pillar 161 passes through the cap plate 181, to be described further later, and upwardly extends and protrudes a predetermined length. In addition, the second electrode terminal pillar 161 is electrically connected to the second current collector plate 150 under the cap plate 181. While the second electrode terminal pillar 161 upwardly extends and protrudes a predetermined length from the cap plate 181, a laterally extending flange 161*a* may be located under the cap plate 181 to prevent the second electrode terminal pillar 161 from being dislodged from the cap plate 181. In an embodiment, a region of the second electrode terminal pillar 161 located below the flange 161*a* may be fitted into the second fastening hole 152*a* of the second current collector plate 150 to then be riveted or welded. In addition, a region of the second electrode terminal pillar 161 located above the flange 161*a* may pass through the cap plate 181 and upwardly extend and protrude a predetermined length. The second electrode connection plate 162 may be fixed to the extending and protruding region of the second electrode terminal pillar 161.

The second electrode connection plate 162 is shaped of a plate including a second terminal hole 162*a* passing through top and bottom surfaces of the second electrode connection plate 162. The second terminal hole 162*a* of the second electrode connection plate 162 may be sized and shaped to correspond to the second electrode terminal pillar 161 in a horizontal direction so as to accommodate the second electrode terminal pillar 161. The second electrode terminal pillar 161 upwardly protruding from the cap plate 181 may be fitted into the second terminal hole 162*a* of the second electrode connection plate 162 to then be riveted or welded.

The second terminal portion 160 may be made of, for example, one selected from the group consisting of aluminum, an aluminum alloy and an equivalent thereof. However, embodiments of the present invention are not limited to the materials of the second terminal portion 160 disclosed herein.

The case 170 may be made of a conductive metal such as aluminum, an aluminum alloy, or nickel-plated steel, and may have a substantially hexahedral shape with a top opening 171 through which the electrode assembly 110, the first current collector plate 120, and the second current collector plate 150 are inserted and placed. Since the case 170 and the cap assembly 180 assembled with each other are illustrated in FIGS. 1 and 2, the top opening 171 is not specifically shown. However, the top opening 171 is a peripheral portion of the cap assembly 180. Meanwhile, the interior surface of the case 170 is treated with an insulation process to be insulated from the electrode assembly 110, the first current collector plate 120, the second current collector plate 150 and the cap assembly 180.

The cap assembly 180 is coupled to the case 170. Specifically, the cap assembly 180 includes the cap plate 181 including the pressure equalization structure 210, seal gaskets 183 and 187, upper insulation members 184 and 186, lower insulation members 185 and 188, the inversion plate 189, an injection hole 191 and a sealing plug 193.

The cap plate 181 may basically seal the top opening 171 of the case 170 and may be made of the same material as the case 170. For example, in one embodiment, the cap plate 181 may be coupled to the case 170 by laser welding. The cap plate 181 may be electrically connected to the second terminal portion 160, so that the cap plate 181 has the same polarity as the second terminal portion 160. Accordingly, the cap plate 181 and the case 170 may have the same polarity. The cap plate 181 includes a vent hole 181*a* and a short-circuit hole 181*b* passing through top and bottom surfaces of the cap plate 181. Here, the short-circuit hole 181*b* is positioned under the first connection plate 132.

The safety vent 182 may be installed in the vent hole 181*a* of the cap plate 181 and may have a notch configured to be opened at a preset pressure. For example, in one embodiment, when the internal pressure of the case 170 exceeds the preset pressure (e.g., a first reference pressure) due to overcharge of the secondary battery 100, the safety vent 182 is ruptured to be opened, thereby reducing the internal pressure of the case 170.

The seal gaskets 183 and 187, which are made of an insulating material, include a first seal gasket 183 located between the first electrode terminal pillar 131 and the cap plate 181, and a second seal gasket 187 located between the second electrode terminal pillar 161 and the cap plate 181. In addition, the seal gaskets 183 and 187 seal portions between each of the first electrode terminal pillar 131 and the second electrode terminal 161 and the cap plate 181. The first seal gasket 183 and the second seal gasket 187 may prevent external moisture from penetrating into the secondary battery 100 and may prevent an electrolyte accommodated in the secondary battery 100 from flowing out.

The upper insulation members 184 and 186 include a first upper insulation member 184 located between the first connection plate 132 and the cap plate 181, and a second upper insulation member 186 located between the second connection plate 132 and the cap plate 181.

The first upper insulation member 184 electrically insulates the first connection plate 132 and the cap plate 181 from each other. In addition, the first upper insulation member 184 is brought into close contact with the cap plate 181. In addition; the first upper insulation member 184 may be brought into close contact with the seal gasket 182. The upper insulation member 184 may electrically insulate the first terminal portion 130 and the cap plate 181 from each other.

The second upper insulation member 186 may also be located between the second electrode connection plate 162 and the cap plate 181, and a portion of the second electrode connection plate 162 makes contact with the cap plate 181 to be electrically connected.

The lower insulation members 185 and 188 include a first lower insulation member 185 located between the first current collector plate 120 and the cap plate 181, and a second lower insulation member 188 located between the second current collector plate 150 and the cap plate 181.

The first lower insulation member 185 and the second lower insulation member 188 may prevent unnecessary short circuits from occurring between the first and second current collector plates 120 and 150 the cap plate 181. That is to say, the first lower insulation member 185 and the second lower insulation member 188 may prevent short circuits from occurring between the first current collector plate 120 and the cap plate 181 and between the second current collector plate 150 and the cap plate 181, respectively. In addition, the first lower insulation member 185 and the second lower insulation member 188 are located between each of the first electrode terminal pillar 131 and the second electrode terminal pillar 161 and the cap plate 181, thereby preventing unnecessary short circuits from occurring between the first electrode terminal pillar 131 and the second electrode terminal pillar 161 and the cap plate 181.

The inversion plate 189 is located in the short-circuit hole 181*b* of the cap plate 181 and is covered by the first connection plate 132. Here, the inversion plate 189 has a downwardly convex round part and an edge part fixed to the cap plate 181. The inversion plate 189 and the cap plate 181 have the same polarity. In addition, when the internal pressure exceeds the preset pressure (e.g., a second reference pressure) due to overcharge of the secondary battery 100, the inversion plate 189 may be inverted to then upwardly convexly protrude.

That is to say, when the internal pressure exceeds the preset pressure (e.g., the second reference pressure) due to overcharge of the secondary battery 100 according various embodiments of the present invention, the first connection plate 132 makes contact with the upwardly convexly protruding inversion plate 189, thereby inducing a short circuit. Accordingly, short-circuit current may flow from the first electrode plate 111 to the second electrode plate 112 through the cap plate 181. In addition, when the internal pressure of the secondary battery 100 exceeds a preset pressure (e.g., a third reference pressure greater than the second reference pressure), the safety vent 182 is ruptured, and internal gases of the secondary battery 100 are all exhausted.

The injection hole 191 is located to pass through the cap plate 181, and an electrolyte may be injected into the case 170 through the injection hole 191. Once the electrolyte is injected, the sealing plug 193 is engaged with the injection hole 191, thereby preventing the electrolyte from flowing out.

As shown in FIGS. 2 and 3, the pressure equalization structure 210 is located in the cap plate 181 to allow the internal and external pressures of the case 170 to be in an equalized state all the time. The pressure equalization structure 210 may include, for example, but not limited to, a throughhole 210A located in the cap plate 181, and a breathable film 214 closing the throughhole 210A. In addition, the pressure equalization structure 210 may be located between the safety vent 182 and the first terminal portion 130, between the safety vent 182 and the sealing plug 193, or between the sealing plug 193 and the second terminal portion 160.

Here, the throughhole 210A may include a first throughhole 211 having a relatively small diameter, a second throughhole 212 connected to the first throughhole 211 and having a relatively large diameter, and a sill 213 created due to a difference in the diameter between the first throughhole 211 and the second throughhole 212.

Diameters of the first and second throughholes 211 and 212 may be much smaller than a diameter of the vent hole 181a. The diameter of the vent hole 181a may range from, for example, about 10 mm to about 500 mm, and the diameters of the first and second throughholes 211 and 212 may range from, for example, about 0.01 mm to about 0.1 mm, but embodiments of the present invention are not limited to the diameter ranges disclosed herein.

Here, if the diameters of the first and second throughholes 211 and 212 are smaller than about 0.01 mm, too long a time may be taken to reach an equalized state of the internal and external pressures of the case 170. In addition, if the diameters of the first and second throughholes 211 and 212 are greater than about 0.1 mm, it may be difficult to achieve an internal vacuum of the case 170 during the electrolyte injection process.

The breathable film 214 bonded to the sill 213 between the first and second throughholes 211 and 212. In an example embodiment, a bonding layer 215 may be positioned at a region corresponding to the bottom periphery of the breathable film 214 to then be bonded to the sill 213. In addition to the aforementioned configuration of the pressure equalization structure 210, the pressure equalization structure 210 may also be configured to include a throughhole having the same diameter as the cap plate 181, a bonding layer bonded to a top surface or a bottom surface of the cap plate 181 so as to close the throughhole, and a breathable film bonded to the bonding layer.

With the pressure equalization structure 210, when the internal pressure of the secondary battery 100 exceeds the preset pressure (e.g., the first reference pressure), the internal air or gases may be exhausted through the breathable film 214, thereby equalizing the internal and external pressures of the secondary battery 100.

Therefore, operational failures of the inversion plate 189 and/or the safety vent 182 can be prevented without causing deformation of the secondary battery 100. In addition, the breathable film 214 allows the internal air or gases to be exhausted while preventing external foreign matter from penetrating into the secondary battery 100.

In addition, the operations of the inversion plate 189 and the safety vent 182 may not be impeded by the pressure equalization structure 210. That is to say, when the secondary battery 100 is overcharged, the internal pressure of the secondary battery 100 may rapidly increase over time. Therefore, the inversion plate 189 and the safety vent 182 normally operate, irrespective of the operation of the pressure equalization structure 210.

For example, when the internal pressure reaches the first reference pressure due to prolonged use of the secondary battery 100, the pressure equalization structure 210 operates to equalize the internal pressure and the external pressure. However, when the internal pressure reaches the second reference pressure greater than the first reference pressure due to overcharge of battery, which generally occurs for an extremely short time, the inversion plate 189 is inverted, irrespective of the operation of the pressure equalization structure 210. Accordingly, the battery energy may be consumed by the short circuit occurring between the inversion plate 189 and the connection plate 132, and the safety of battery may be secured owing to the operation of the fuse. In addition, even after the safety-related operation, when the internal pressure reaches the third reference pressure greater than the second reference pressure, which generally occurs instantaneously, i.e., for an extremely short time, the safety vent 182 is ruptured to rapidly release the internal gases, irrespective of the operations of the pressure equalization structure 210 and the inversion plate 189, thereby securing the safety of battery.

Figure 4:
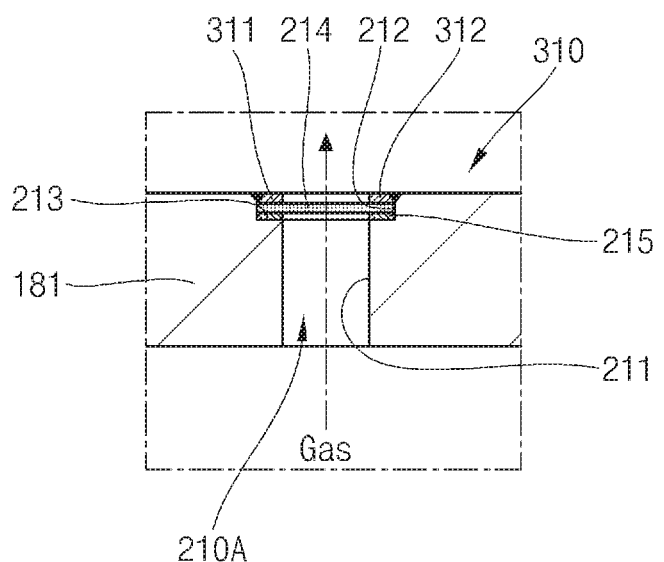
FIG. 4 is an enlarged cross-sectional view of a pressure equalization structure according various embodiments of the present invention.

FIG. 4 is an enlarged cross-sectional view of a pressure equalization structure 310 according various embodiments of the present invention.

As shown in FIG. 4, the pressure equalization structure 310 may further include a ring member 311 positioned on the top periphery of the breathable film 214 and welded to the cap plate 181. That is to say, the bottom periphery of the breathable film 214 may be bonded to the sill 213 between the first and second throughholes 211 and 212 through the bonding layer 215, and the top periphery of the breathable film 214 may be downwardly pressed through the ring member 311. In addition, the ring member 311 may be made of a metal (e.g., aluminum or an aluminum alloy) to be welded to the cap plate 181.

Figure 5:
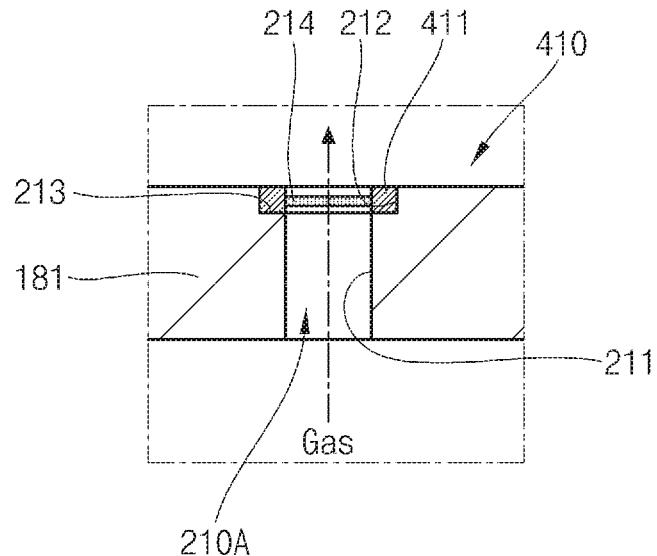
FIG. 5 is an enlarged cross-sectional view of a pressure equalization structure according various embodiments of the present invention.

With the configuration, the pressure equalization structure 310 is more tightly coupled to a throughhole 310A. Accordingly, the electrolyte accommodated in the battery may not flow out through the pressure equalization structure 310. In FIG. 5, undefined reference numeral 312 denotes a welding region.

FIG. 5 is an enlarged cross-sectional view of a pressure equalization structure 410 according various embodiments of the present invention.

As shown in FIG. 5, the pressure equalization structure 410 may include a breathable film 214, and an injection molding 411 (e.g., a plastic not reacting with an electrolyte, such as PP, PE or EPDM) located on top and bottom peripheries of the breathable film 214. The breathable film 214 and the injection molding 411 may be provided by, for example, a double injection process. In this way, the injection molding 411 is coupled to the second throughhole 212 and the sill 213 in an interferential fit manner, thereby providing the pressure equalization structure 410 in the cap plate 181.

Meanwhile, porous paper (not shown) may further be coupled to the top surface and/or the bottom surface of the breathable film 214 to reinforce stiffness of the breathable film 214. The porous paper may also have air permeability and may reinforce the stiffness of the breathable film 214. The porous paper can be commonly applied to all example breathable films disclosed in various embodiments of the present invention.

Figure 6:
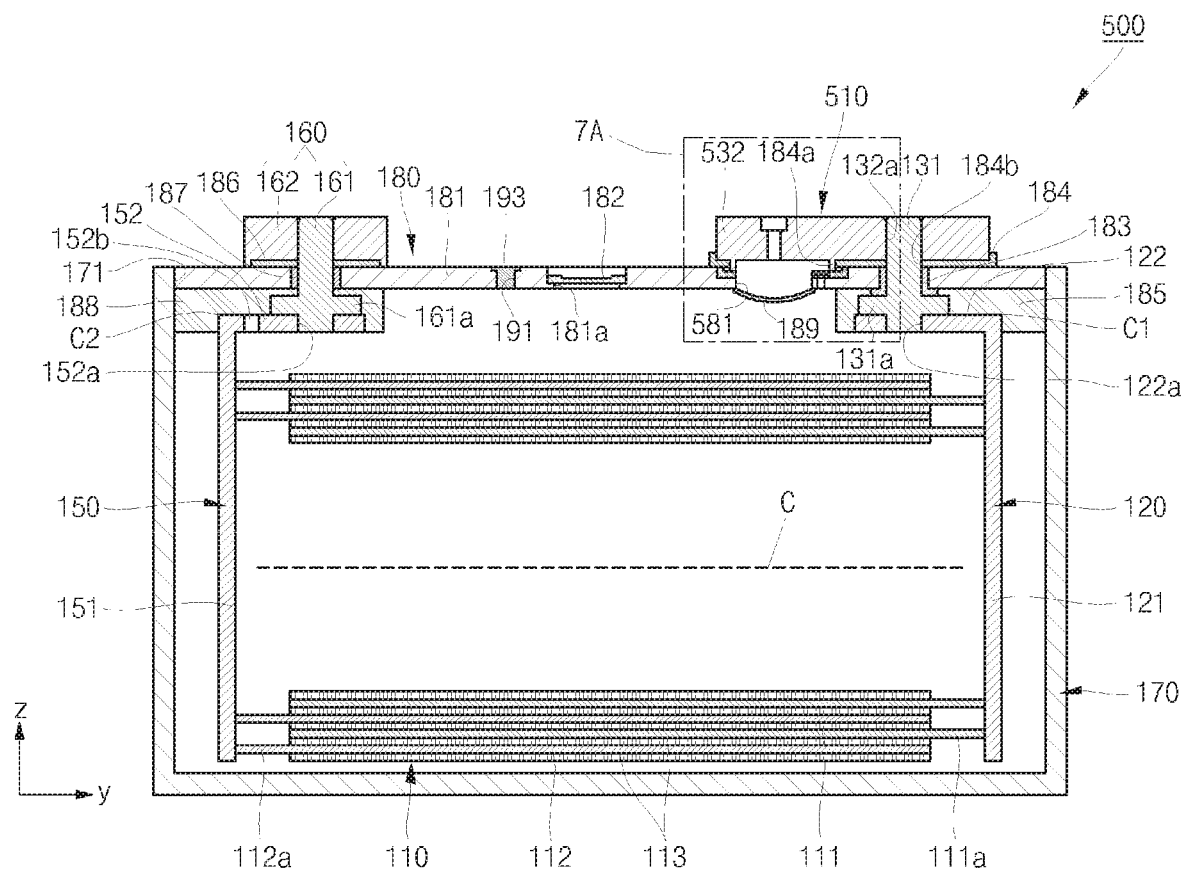
FIG. 6 is a perspective view of a secondary battery capable of equalizing internal/external pressure according various embodiments of the present invention.
Figure 7A:
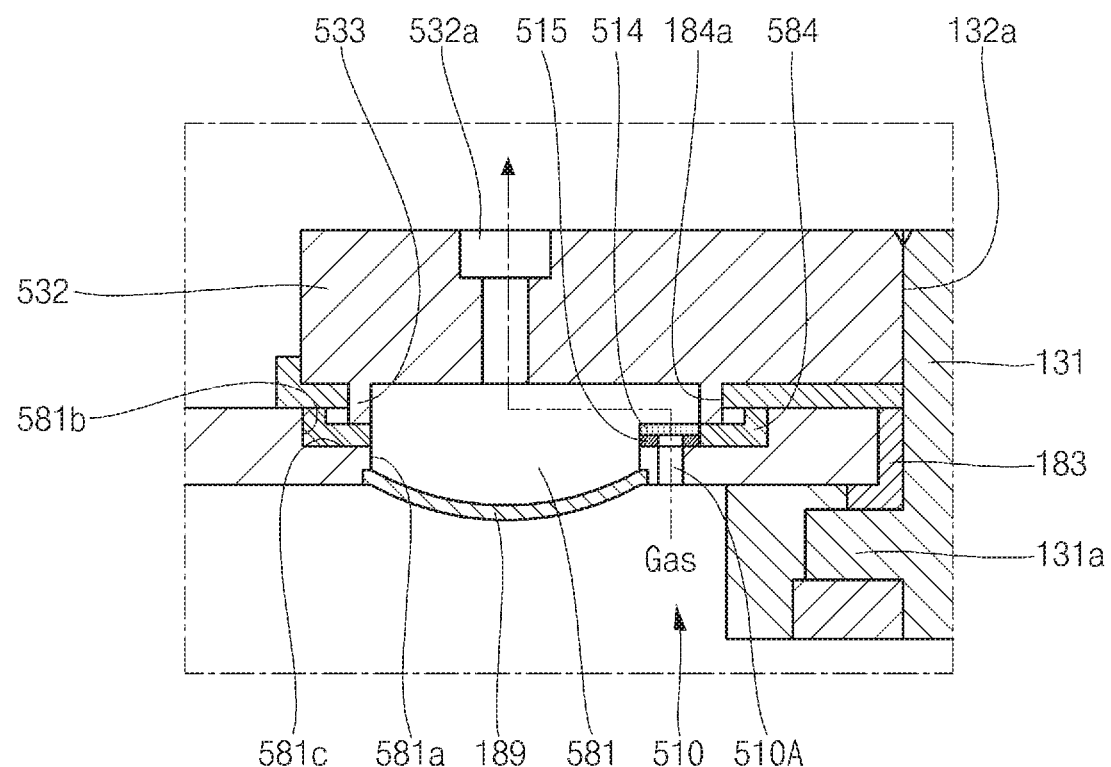
FIG. 7A is an enlarged cross-sectional view of a pressure equalization structure in a region 7a shown in FIG. 6.
Figure 7B:
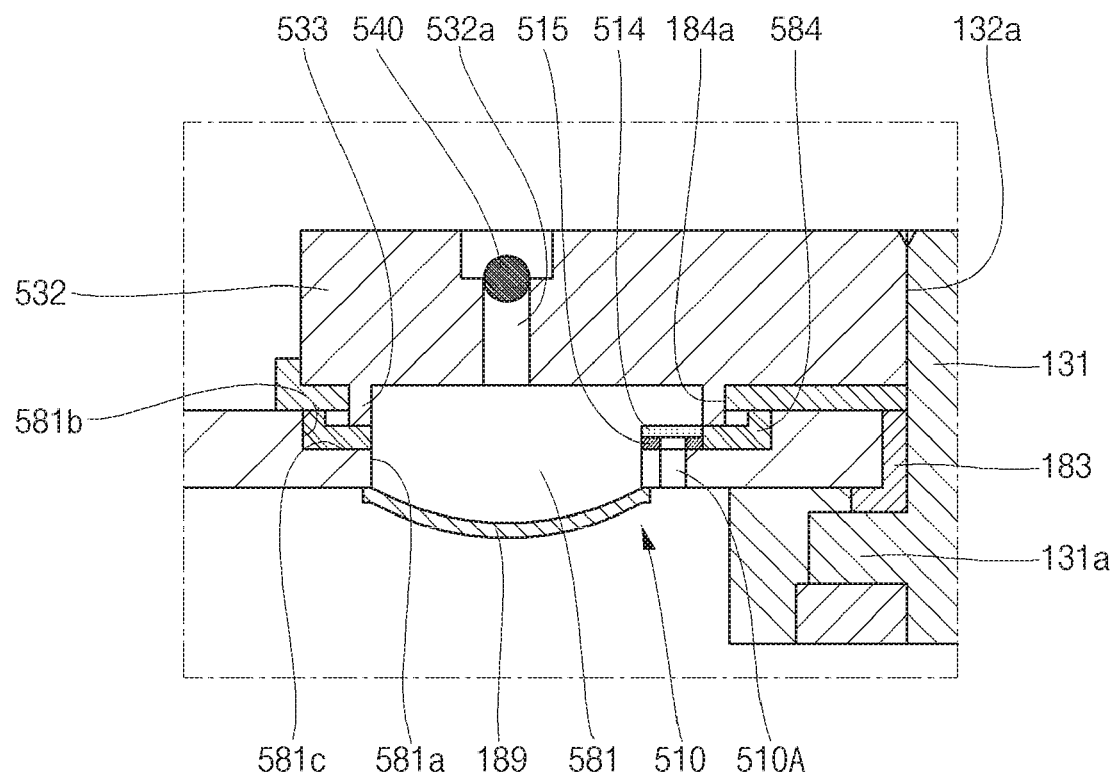
FIG. 7B is a cross-sectional view illustrating a state of the pressure equalization structure during a battery manufacturing process.

FIG. 6 is a perspective view of a secondary battery 500 capable of equalizing internal/external pressure according various embodiments of the present invention, FIG. 7A is an enlarged cross-sectional view of a pressure equalization structure 510 in a region 7a shown in FIG. 6, and FIG. 7B is a cross-sectional view illustrating a state of the pressure equalization structure 510 during a battery manufacturing process.

As shown in FIGS. 6 and 7A, the first terminal portion 130 includes a terminal pillar 131 connected to the electrode assembly 110 and passing through the cap plate 181, and a first connection plate 532 coupled to the terminal pillar 131 and located on the cap plate 181 in an insulated state, and the cap plate 181 includes the inversion plate 189 located to correspond to the first connection plate 532. Here, the inversion plate 189 may be bonded to a short-circuit hole 581 corresponding to the connection plate 532.

In addition, the pressure equalization structure 510 may be located at a region of the cap plate 181 overlapping with (corresponding to) the first connection plate 532. That is to say, the short-circuit hole 581 includes a first short-circuit hole 581a having a predetermined diameter, a second short-circuit hole 581b having a larger diameter than the first short-circuit hole 581a, and a sill 581c located between the first and second short-circuit holes 581a and 581b. Here, the pressure equalization structure 510 may be located in the sill 581c.

In other words, a throughhole 510A is located in the sill 581c, and the bonding layer 515 is positioned on a top surface of the sill 581c at the exterior of the throughhole 510A to allow the breathable film 514 to be bonded to the throughhole 510A. In addition, the first connection plate 532 includes a protrusion 533 protruding toward the sill 581c. The protrusion 533 may be brought into close contact with an additional seal gasket 584 placed on the sill 581c to then be sealed.

Meanwhile, a throughhole 532a may be further located in the first connection plate 532 corresponding to the short-circuit hole 581 so as to release the internal air or gases through the pressure equalization structure 510. Therefore, the internal air or gases through the pressure equalization structure 510 may be exhausted to the exterior through the throughhole 532a of the first connection plate 532. Accordingly, the internal and external pressures of the secondary battery 500 may be equalized.

As shown in FIG. 7B, in order to maintain an internal space of the case 170 at a vacuum during the manufacture of the secondary battery 500, a plug 540, such as a seal ball, may be further coupled to the throughhole 532a of the first connection plate 532. Of course, after the secondary battery 500 is completed, the plug 540 is removed for operating the pressure equalization structure 510. Therefore, although the secondary battery 500 according to the present invention includes the pressure equalization structure 510, the internal space of the case 170 can be maintained at a vacuum during an electrolyte injection process, so that the electrolyte injection process is normally performed.

Figure 8A:
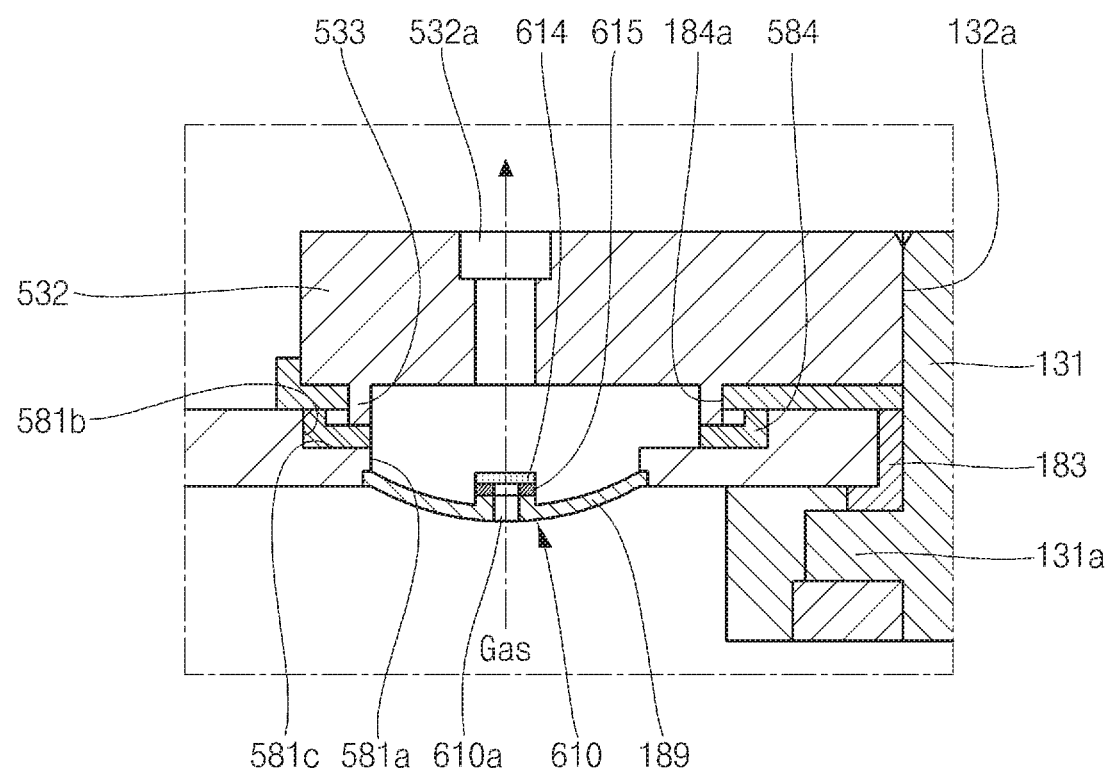
FIG. 8A is an enlarged cross-sectional view of a pressure equalization structure according various embodiments of the present invention.
Figure 8B:
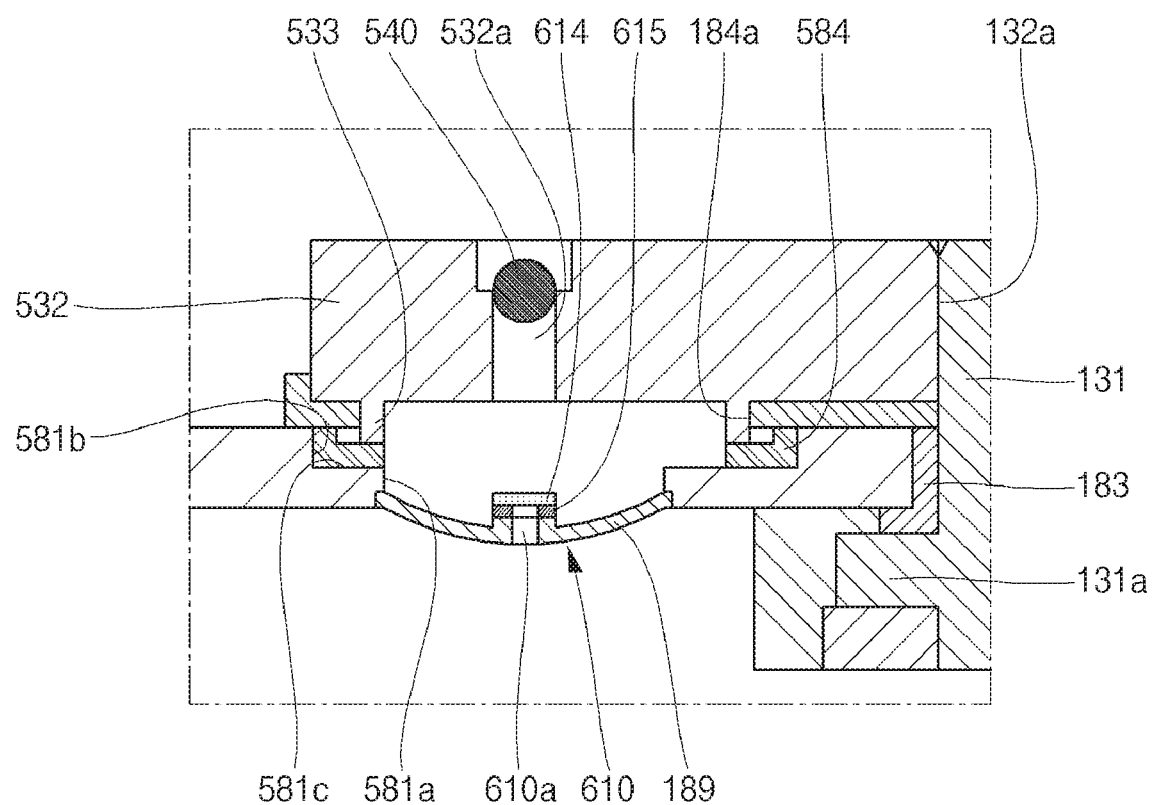
FIG. 8B is a cross-sectional view illustrating a state of the pressure equalization structure during a battery manufacturing process.

FIG. 8A is an enlarged cross-sectional view of a pressure equalization structure 610 according various embodiments of the present invention, and FIG. 8B is a cross-sectional view illustrating a state of the pressure equalization structure 610 during a battery manufacturing process.

As shown in FIG. 8A, the pressure equalization structure 610 may be directly installed in the inversion plate 189. That is to say, the pressure equalization structure 610 may include a throughhole 610a located roughly at the center of the inversion plate 189, a bonding layer bonded to a top portion of the throughhole 610a, and a breathable film 614 bonded to the bonding layer 615.

Therefore, when the internal pressure of a secondary battery exceeds the first reference pressure, the internal gases may be exhausted through the pressure equalization structure 610 installed in the inversion plate 189, thereby equalizing the internal pressure and external pressure of the secondary battery.

In addition, since the pressure equalization structure 610 is installed in the inversion plate 189, the inversion plate 189 may not be shorted to the first connection plate 532 when the inversion plate 189 is inverted. However, since the throughhole 532a located in the first connection plate 532 has an inner diameter slightly larger than an outer diameter of the pressure equalization structure 610, the pressure equalization structure 610 is coupled to the throughhole 532a of the first connection plate 532 when the inversion plate 189 is inverted, thereby allowing the inversion plate 189 corresponding to the exterior of the pressure equalization structure 610 to be easily shorted to the first connection plate 532. Therefore, the inversion plate 189 may well operate even with the pressure equalization structure 610 installed therein.

As shown in FIG. 8B, in order to maintain an internal space of the case 170 at a vacuum during the manufacture of the secondary battery 500, the plug 540, such as a seal ball, may be further coupled to the throughhole 532a of the first connection plate 532. After the secondary battery is completed, the plug 540 is removed.

Although the foregoing embodiments have been described to practice the secondary battery capable of equalizing internal/external pressure according to the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
an electrode assembly;
a case that accommodates the electrode assembly;
a cap plate that seals the case, and that comprises a safety vent;
a terminal portion that is electrically connected to the electrode assembly, that extends outwardly from the cap plate, and that comprises:
a terminal pillar connected to the electrode assembly and passing through the cap plate; and
a connection plate coupled to the terminal pillar and located on the cap plate in an insulated state; and a pressure equalization structure on the cap plate, and configured to equalize internal pressure and external pressure of the case when the internal pressure is at a first internal pressure, wherein the cap plate further comprises an inversion plate that is separate from the pressure equalization structure and the safety vent, that is located to correspond to the connection plate, and that is configured to be inverted when the internal pressure is at a second internal pressure that is greater than the first internal pressure, and wherein the safety vent is configured to be ruptured when the internal pressure is at a third internal pressure that is greater than the second internal pressure.

2. The secondary battery of claim 1, wherein the pressure equalization structure defines a first throughhole at an inner side of the cap plate, and a second throughhole in the cap plate,
   wherein the second throughhole has a larger diameter than the first throughhole, and
   wherein the pressure equalization structure comprises a breathable film bonded to the second throughhole.

3. The secondary battery of claim 2, further comprising a bonding layer positioned between a bottom periphery of the breathable film and the cap plate.

4. The secondary battery of claim 2, further comprising a ring member positioned on a top periphery of the breathable film and welded to the cap plate.

5. The secondary battery of claim 2, further comprising an injection molding located at a periphery of the breathable film, and fitted into the second throughhole in an interferential fit manner.

6. The secondary battery of claim 1, wherein the pressure equalization structure is located at the cap plate overlapping with the connection plate.

7. The secondary battery of claim 6, wherein the pressure equalization structure comprises:
   a first throughhole defined by the cap plate; and
   a breathable film bonded to a portion of the cap plate defining the first throughhole.

8. The secondary battery of claim 1, wherein the pressure equalization structure is located in the inversion plate.

9. The secondary battery of claim 8, wherein the pressure equalization structure comprises:
   a first throughhole defined by the cap plate; and
   a breathable film closing the first throughhole.

10. The secondary battery of claim 9, wherein the first throughhole is at an inner side of the connection plate.

* * * * *